July 2, 1968  L. LYNN  3,390,687
TOBACCO SMOKE FILTER FOR CIGARETTES, CIGARS, PIPES AND THE LIKE
Filed Jan. 23, 1967
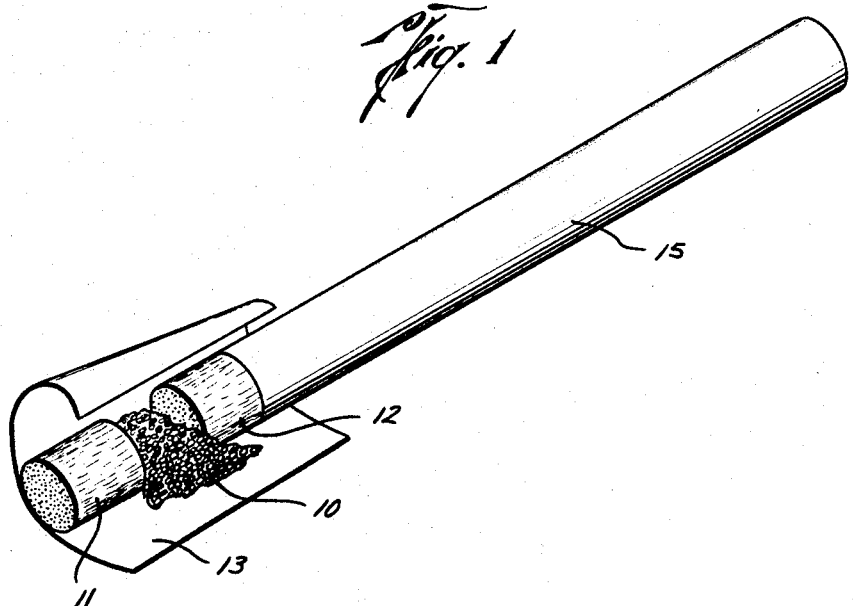
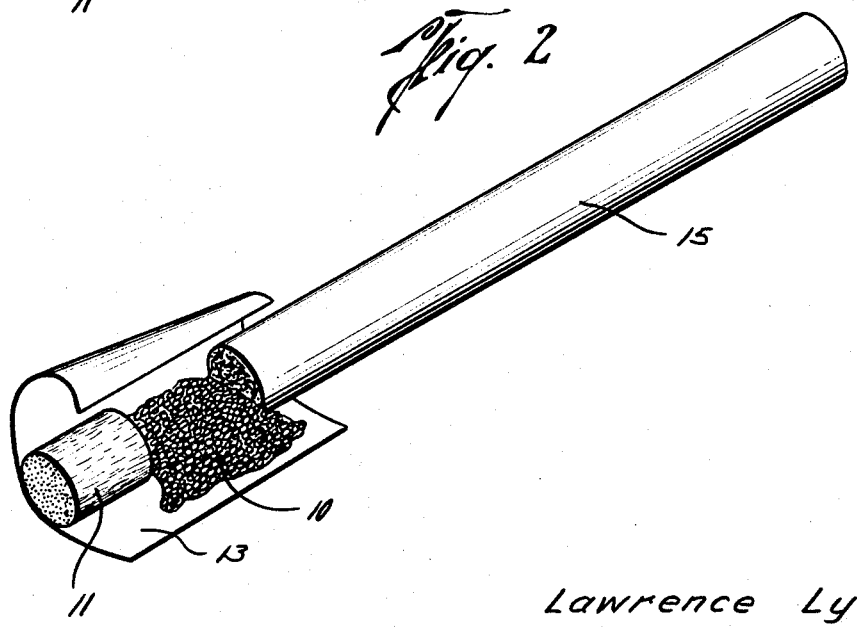
Lawrence Lynn
INVENTOR.
BY
ATTORNEY United States Patent Office 3,390,687
Patented July 2, 1968

3,390,687
TOBACCO SMOKE FILTER FOR CIGARETTES, CIGARS, PIPES AND THE LIKE
Lawrence Lynn, Houston, Tex., assignor to Riviana Foods Inc., Houston, Tex.
Continuation-in-part of application Ser. No. 427,285, Jan. 22, 1965. This application Jan. 23, 1967, Ser. No. 617,752
14 Claims. (Cl. 131—266)

*Cross-reference to related applications*

This application is a continuation-in-part of application No. 427,285 filed Jan. 22, 1965.

*Background of the invention*

(1) *Field of the invention.*—This invention relates to a new filtering material for cigarettes, cigars, pipes and the like.

It has long been an object in the manufacture of smoking tobacco products to produce filters for cigarettes, cigars and pipes and the like to substantially reduce tars, resins and alkaloids, such as nicotine, which are inhaled during the smoking of tobacco. Many persons who smoke tobacco believe that the tars, resins, alkaloids and the like in tobacco smoke are injurious to health, and other consumers prefer to use a filter to remove these materials for reasons of personal taste, cleanliness, or esthetics.

(2) *Description of the prior art.*—Heretofore, filtering materials such as cotton, cellulose acetate, fiberglass and the like have been employed to collect and remove from the smoke certain condensible products contained therein. Further, highly porous solid materials, such as activated carbons or charcoals, have been employed to remove such undesirable constituents of the smoke. However, in the use of the aforementioned products as filtering materials, certain problems arise such as off-flavor, loss of natural tobacco flavor, low filtering efficiency, and high cost.

*Summary of the invention*

A primary object of this invention is to provide filtering material for use in filtering tobacco smoke which combines the advantages of low-cost, efficient filtration, ease of draw, and minimum flavor interference.

Another object of this invention is to provide a filtering agent adapted to be used in the manufacture of self-contained filters for cigarettes and the like.

Other objects and advantages of the present invention will appear in the following description, examples and appended claims.

The foregoing objects are achieved by this invention by providing, either alone or in combination with other filtering means, a precooked rice material in the form of discreet particles ranging in size from between about 100 and 850 microns in diameter as a filtering agent in a tobacco smoke filter. The precooked rice material is produced by subjecting whole grains or broken grains of white milled rice, brown rice, or parboiled rice to heat and moisture in amounts necessary for substantially complete cooking or gelatinization of the starch as measured organoleptically or chemically.

The rice is preferably cooked by immersion cooking or by a combination of immersion cooking and steaming. Any suitable cooking means may be employed; however, during at least a part of the cooking, an excess of water should be provided over that required for gelatinization. The weight of water required for gelatinization of rice varies generally from an amount as low as about double the weight of the rice being cooked to as high as about four times the weight of the rice being cooked. I presently prefer to employ a great deal more water than four times the weight of the rice being cooked. The total cooking time required to gelatinize the rice without causing the rupture of any substantial portion of the rice cells is between nine to eighteen minutes at about 190 to 210° F. for raw rice and between eighteen to twenty-nine minutes at about 190 to 210° F. for parboiled rice and preferably about twenty-three minutes. If a two-step cooking procedure is employed for raw rice, the immersion cooking should be between nine to thirteen minutes at 195 to 210° F. and the steaming should be for a period of up to four minutes, preferably 0.5 to 3.5 minutes at pressures from 0 to 5 p.s.i.g. When the two-step procedure is employed for parboiled rice, the immersion cooking should be between nine to fifteen minutes at 195° F. to 210° F. and the steaming should be from one to five minutes, preferably two to four minutes at pressures from 0 to 5 p.s.i.g.

It is presently preferred that loose starch be removed from the rice by at least one cold water washing and quenching step. If a two-step procedure of cooking is employed an intermediate cold water wash and quenching step is advantageous between the immersion cooking and the steaming steps in order to facilitate the removal of loose starch. Although, as noted above, the steaming step is not necessary to produce the precooked rice utilized in the manufacture of the rice particles for the present invention, it is advantageous as a means of completing gelatinization of the rice with little or no increase in moisture content, and with a minimum rupture of starch cells.

After the cooking or gelatinization of the rice is complete, it should be dried by either a batch or continuous procedure. Freeze drying or drying by hot air or other means may be used. For example, the moisture may be effectively removed by a stream of heated air or a stream of heated inert gas such as nitrogen. In order to obtain a porous dried rice particle, I prefer to dry the cooked rice by a stream of heated air at a temperature ranging from 230 to 270° F. for raw rice, and from 240 to 300° F. for parboiled rice at a residence time of from nine to twenty minutes as necessary to obtain the desired final moisture content. The rice should be dried to a final moisture level below 14% and preferably between 6 and 12%.

After the cooked and washed rice particles of whole kernels or broken kernels have been dried to the desired moisture content, the grains are then subjected to conventional grinding or milling processes to produce a granular size, ranging from between 100 to 850 microns in approximate diameter. The rice particles used in this invention are preferably irregular shaped and of sufficient porosity to entrain and trap combustion products of tobacco contained in the smoke normally inhaled during the smoking of cigarettes, cigars, pipes and the like. Precooked rice particles prepared as described herein will absorb water in amounts at least 4 times the weight of the rice particles when immersed in water at 25° C. It is preferred that precooked rice particles used as a smoke filtering agent should have the capacity to absorb water in amounts at least 4 times their own weight when immersed in an excess of water at 25° C. for five minutes.

A suitable precooked rice product and process of manufacture thereof is more fully disclosed in an application by Lawrence Lynn and Roy M. Anderson entitled "Precooked Rice Flour and Method of Preparation Thereof," application No. 427,486, filed Jan. 22, 1965. The rice particles used in this invention are preferably irregularly shaped and of sufficient porosity to entrain and trap combustion products of tobacco contained in the smoke normally inhaled during the smoking of cigarettes, cigars, pipes and the like.

In describing any filtering agent, the particles may be referred to as "precooked" rice particles. By "precooked" rice I mean rice which has been gelatinized or cooked in contact with water and/or steam and dried to a moisture content of less than 14% water by weight. "Precooked rice particles" or "precooked rice flour" is the granular rice produced by conventional grinding or milling of such precooked rice.

The above described rice particles, ranging in size from 100 to 850 microns in diameter, but preferably between 420 and 840 microns in diameter, are used as a tobacco smoke filtering element in the practice of my invention.

*Brief description of the drawings*

Turning now to the drawings, FIG. 1 is an axonometric projection of a cigarette with the filter wrapper shown opened to expose a filter construction illustrative of one embodiment of this invention. FIG. 2 is an axonometric projection of a cigarette with the filter wrapper shown opened to expose the filter construction of an alternative embodiment of this invention.

*Description of preferred embodiments*

In one preferred embodiment of my invention the filter is prepared by forming a cylindrical tube about ¾ inch long, having a cross sectional area identical to that of a standard cigarette, with about ¼ to ⅝ inch of the length of said tube being filled with said precooked rice particles and further being held in place within the tube by closures of suitable pervious material at each end of the filter tube. The closure material may be selected to provide additional filtering in cooperation with the precooked rice particles in a multicomponent filter embodiment of my invention. The above described tubular shaped filter may be attached to the cigarette by any conventional means.

In an alternative embodiment of the invention, the filter may be prepared by forming a cylindrical tube with a pervious closure at only one end and with the precooked rice material being disposed between such closure and the tobacco of the cigarette. It will be apparent that any desired size filter may be used and that it can be used as the filtering element for pipe stems or cigar holders as well as for cigarettes. Any suitable means may be provided to retain the filter material. Moreover the precooked rice particles may be premolded with or without the incorporation of a suitable binder as by warm extrusion after moistening to form a porous disc of the diameter of a cigarette to provide a pervious filter material having sufficient strength to be used without closure means. Further, the precooked rice particles may be mixed or combined with other filter materials such as cellulose acetate, cotton batting, fiberglass, activated carbon or the like to form a composite filter element.

In FIG. 1, the filter element 10 comprising a body of precooked rice particles is retained in position by pervious closure elements 11 and 12 and wrapper 13. Closure element 12 is disposed between the filter element and the tobacco-containing portion 15 of the cigarette.

In FIG. 2, the filter element 10 is retained in position between the tobacco-containing portion 15 of the cigarette, pervious closure 11 and wrapper 13.

A number of cigarettes have been fitted with filters constructed in accordance with this invention, utilizing the embodiment of FIG. 1 where a filter measuring approximately ¾ inch in length was constructed with a filter section approximately ¼ inch in length filled with particles of precooked rice. The cigarettes so constructed were tested and compared with the commercially available cigarettes containing a volume of activated charcoal equal to the volume of precooked rice particles in the filters constructed according to this invention. A first series of 10 cigarettes were tested in which the filter element employed was composed of precooked rice particles ranging in size from approximately 250 microns to approximately 420 microns with a bulk density of approximately .78 gm./cc. The filter elments were first weighed, and the 10 test cigarettes were smoked by the application of controlled suction to cause each cigarette to burn at a rate of approximately 1 inch per minute. The test cigarettes, together with 10 control cigarettes containing an equal volume of activated charcoal as the filter element, were smoked at the same rate for a time sufficient to consume approximately two inches of each cigarette and the filter removed and tested.

Test data on the 10 test cigarettes containing approximately 250 to 420 micron particles of precooked rice and the control are tabulated below:

TABLE 1

| Type of Filter | Weight of Filter Elements Before Smoking (gms.) 10 Cigarettes | Weight of Filter Elements After Smoking (gms.) 10 Cigarettes | Net Weight Gain—10 Filter Elements (gms.) |
|---|---|---|---|
| Precooked Rice, 250-420 Microns | 2.0976 | 2.1482 | 0.0506 |
| Charcoal Granule Filter | 1.2700 | 1.3076 | 0.0376 |

Additional tests were conducted for 10 cigarettes containing particles of precooked rice ranging from approximately 420 microns to 840 microns. The results of these tests are compared with the data for 10 cigarettes containing an equal volume of a commercial activated charcoal filter, giving the following test results:

TABLE 2

| Type of Filter | Weight of Filter Elements Before Smoking (gms.) 10 Cigarettes | Weight of Filter Elements After Smoking (gms.) 10 Cigarettes | Net Weight Gain—10 Filter Elements (gms.) |
|---|---|---|---|
| Precooked Rice, 420-840 Microns | 1.4364 | 1.4704 | 0.0340 |
| Charcoal Granule Filter | 1.2700 | 1.3076 | 0.0376 |

In another aspect of my invention, the embodiments of FIGS. 1 and 2 may be regarded as multicomponent filters in which conventional filtering means may be used to serve both as additional filtering elements and as closure means. It has been observed empirically that the efficiency of absorption of such filtering means, for example, cellulose acetate, was enhanced by the presence of the precooked rice as an adjacent filtering element. In the example illustrated by data in Table 2 above, the cellulose acetate closures were the same as those used for the control. The net weight gain (from 0.4101 to 0.4765 gram) for the cellulose acetate portions (approximately 2 grams for 10 cigarettes) of the total filter was enhanced approximately 16% over the amount absorbed by the control. In the example illustrated in Table 1, the cellulose acetate portions of the total multicomponent filter were found to absorb 86.5% more than the control as measured by net weight gain (from 0.4101 to 0.7652 gram for 10 cigarettes).

For maximum ease of drawing we presently prefer the particle range from approximately 420 to 840 microns with a bulk density ranging from approximately .58 to 0.80 gm./cc., in which such bulk density depends in part upon the processing of the rice during precooking and drying as well as upon the size of the particles. However, as is readily apparent from the above data, improved filtering efficiency for a given volume of filter can be obtained by using a smaller particle size, such as the 250 to 420 micron size particles which have a bulk density of approximately 0.75 to 0.80 gm./cc.

All of the above cigarettes were constructed with the filter element disposed between pervious filter elements comprising cellulose acetate material. Other suitable closure elements may be used, such as, for example, cotton, synthetic fibers, fiberglass or treated synthetic fibers such as those disclosed in Touey et al., U.S. Patent No. 3,003,504, dated Oct. 10, 1961.

Cigarettes employing the filter of this invention have been tested by smokers for ease of draw, flavor of smoke and the like. The filters of this invention were found essentially equal to the control filter cigarettes in ease of draw and superior to charcoal filter cigarettes in that there were no observed off-flavors typical of charcoal granule filters. Further it was observed that there is a minimum of interference with the natural flavor of the cigarette as determined by comparing unfiltered controls with cigarettes containing the rice particle filters.

The used filters of cooked rice particles were examined after smoking and found to be highly discolored, further indicating a large amount of absorption and adsorption of tobacco smoke condensates.

It will be obvious to persons skilled in the art that with minor variations the precooked rice particle filters of this invention may be used in the construction of filters for cigars and pipes. Other changes and modifications of the invention can be made and insofar as such variations incorporate the true spirit of this invention, they are intended to be included within the scope of the appended claims.

I claim:

1. A tobacco smoke filter comprising a body of particles of precooked rice, the filter being characterized in that the particles of precooked rice are of a porous structure; a pervious retaining closure disposed adjacent one end of said body of precooked rice particles; and said body of precooked rice particles being encircled about its circumference by a wrapper.

2. A tobacco smoke filter, having disposed therein a filtering element comprising a body of particles of precooked rice flour, said particles of rice flour being characterized by a porous structure.

3. The device of claim 2 in which said particles of precooked rice are further characterized by the major portion of the starch content of said particles being within unbroken starch cells.

4. The device of claim 2 in which said precooked particles of rice flour range in particle sizes from approximately 100 to 850 microns.

5. The device of claim 2 in which said particles of precooked rice flour range in particle sizes from approximately 420 to 840 microns.

6. The device of claim 2 in which said rice flour ranges in bulk density from approximately 0.40 to 0.80 gm./cc.

7. The device of claim 2 in which said rice flour ranges in bulk density from approximately 0.58 to 0.80 gm./cc.

8. A tobacco smoke filter comprising a body of particles of precooked rice, the filter being characterized in that the particles of precooked rice are of a porous structure and the major portion of the starch content of said particles is contained in unbroken starch cells; said body of precooked rice particles being disposed between pervious retaining closures; and the body of precooked rice particles being encircled about its circumference by a wrapper.

9. The tobacco smoke filter of claim 8, in which said particles of precooked rice have a moisture content below about 14%.

10. The tobacco smoke filter of claim 8, in which said particles of precooked rice have a moisture content between 6% and 12%.

11. A tobacco smoke filter, having disposed therein a filtering element comprising a body of discrete particles of precooked rice flour, said particles of rice flour having a porous structure and further having a moisture content of below about 14%.

12. A tobacco smoke filter, having disposed therein a filtering element comprising a body of particles of precooked rice flour, said particles of rice flour having a porous structure and further having a moisture content between 6% and 12%.

13. In a tobacco smoke filter, a multicomponent filter comprising precooked rice flour particles as one filter element and fibers of cellulose acetate as an additional filter element, said cellulose acetate fibers being adjacent said precooked rice flour particles.

14. The combination of claim 11 in which said precooked rice flour particles are disposed between two cellulose acetate filtering elements.

References Cited

UNITED STATES PATENTS

| | | | |
|---|---|---|---|
| 2,442,928 | 6/1948 | MacMasters et al. | 99—139 |
| 2,597,011 | 5/1952 | MacMasters et al. | 127—32 |
| 3,017,309 | 1/1962 | Crawford et al. | 131—266 X |
| 3,251,365 | 5/1966 | Keith et al. | 131—265 X |

FOREIGN PATENTS 440,316  12/1935  Great Britain.

SAMUEL KOREN, *Primary Examiner.*

D. J. DONOHUE, *Assistant Examiner.*